(No Model.) 2 Sheets—Sheet 1.

G. W. WORDEN.
CRATE FOR SHIPPING BASKETS.

No. 473,047. Patented Apr. 19, 1892.

WITNESSES
F. L. Ourand
N. M. Sterling

INVENTOR
Geo. W. Worden
By S. Kinsabaugh
Attorney (No Model.) 2 Sheets—Sheet 2.

G. W. WORDEN.
CRATE FOR SHIPPING BASKETS.

No. 473,047. Patented Apr. 19, 1892.

WITNESSES
F. L. Ourand
N. M. Sterling

INVENTOR
Geo. W. Worden
By S. H. Ginsabaugh
Attorney

UNITED STATES PATENT OFFICE.

GEORGE W. WORDEN, OF DOVER, DELAWARE.

CRATE FOR SHIPPING BASKETS.

SPECIFICATION forming part of Letters Patent No. 473,047, dated April 19, 1892.

Application filed September 9, 1891. Serial No. 405,218. (No model.)

*To all whom it may concern:*

Be it known that I, GEORGE W. WORDEN, a citizen of the United States, and a resident of Dover, in the county of Kent and State of Delaware, have invented new and useful Improvements in Crates for Shipping Baskets; and I do hereby declare the following to be a full, clear, and exact description of said invention, reference being had to the accompanying drawings, and to the letters of reference marked thereon, which form a part of this specification.

My invention relates to new and useful improvements in crates for shipping baskets and other receptacles containing fruit, the present invention being particularly designed as an improvement on the crate for which Letters Patent were granted me January 13, 1891, No. 444,657.

The object of my invention is to provide a light crate for the shipment of baskets and other receptacles containing fruit, which will not only securely inclose the said basket, but protect the fruit from the effect of jars and strains, to which the crates are liable to be subjected in the course of shipping.

The invention consists in constructing an open-sided crate adapted to receive the baskets of fruit and provided with retaining-wires or their equivalents fastened in the ends of the crate and embracing the baskets between them in such manner that while firmly securing the baskets from lateral displacement they permit sufficient yielding to break, in a great measure, the force of any strain or jar that may be given the crate.

The invention further consists in providing the crate with a yielding bottom in addition to the outer frame, on which the baskets or fruit-containing receptacles rest, and which, being practically a spring bottom, though constructed of slats, will prevent the transmittal to the baskets of the full force of the incidental strains and jars to the crate in the handling and shipping of the fruit.

The invention also consists in certain novel features in the construction and arrangement of parts, all as hereinafter explained, and pointed out in the claims.

Figure 1:
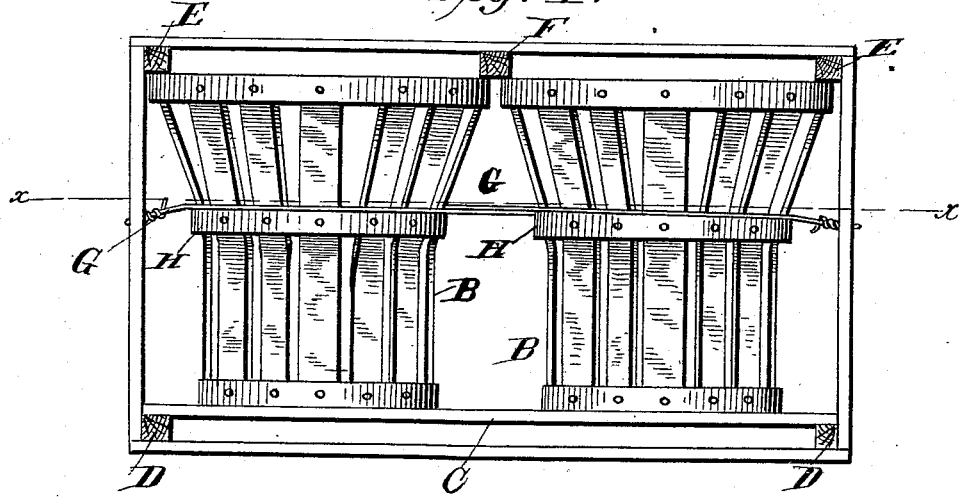
Figure 2:
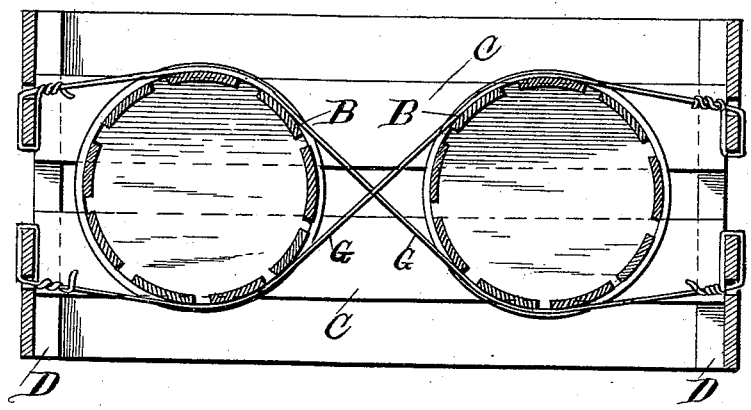
Figure 3:
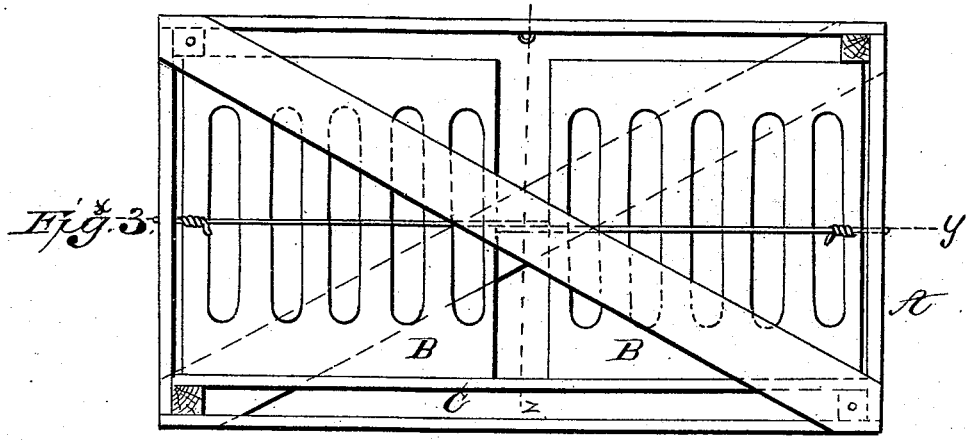
Figure 4:
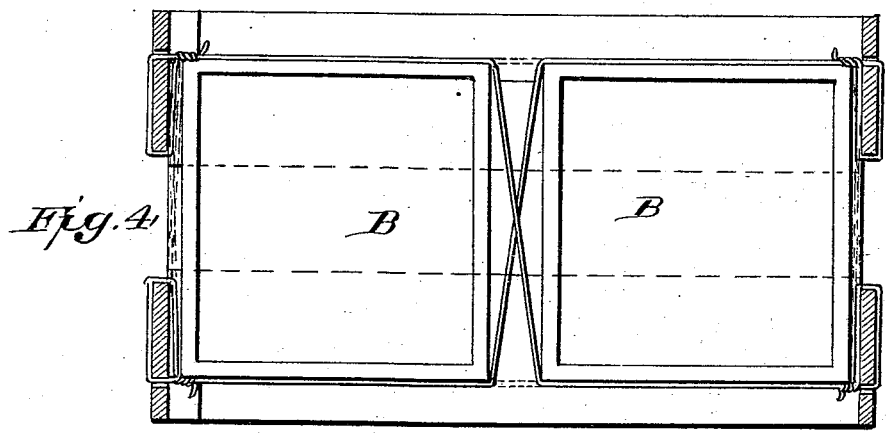
Figure 5:
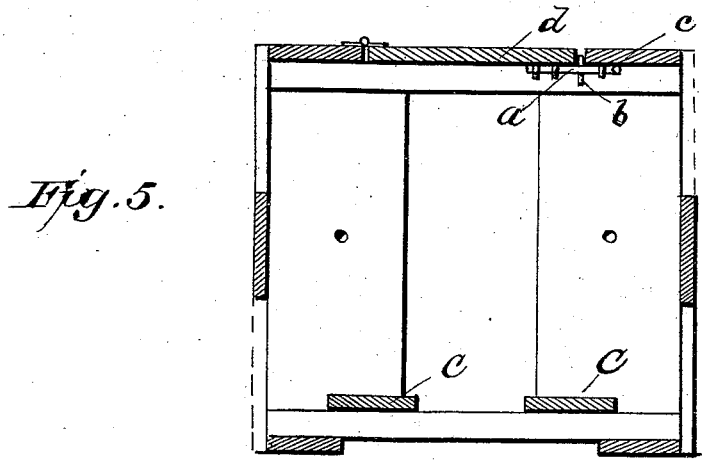
Figure 6:
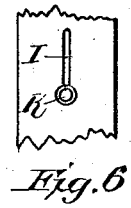

In the accompanying drawings, in which my invention is fully illustrated, Figure 1 is a side elevation of the open-sided crate having two fruit-baskets secured therein ready for shipping. Fig. 2 is a horizontal sectional view of the crate having the baskets secured therein, taken on the line $x\,x$ of Fig. 1. Fig. 3 is a side elevation of the crate provided with two boxes for containing a number of small boxes of fruit. Fig. 4 is a horizontal sectional view taken on the line $y\,y$ of Fig. 3. Fig. 5 is a transverse sectional view taken on the line $z\,z$ of Fig. 3 and showing a locking-bolt for a crate provided with a hinged cover. Fig. 6 is a section of one of the end cleats of the crate, showing the manner in which one of the ends of the retaining-wire is fastened.

The crate A is of a rectangular form, both sides of which are preferably left open. The baskets or other fruit-containing receptacles B, are placed within the crate on the slats C, which are secured to the corner-pieces D to form a yielding bottom on which the baskets rest and to prevent them from receiving the full force of any shocks or strains which may be given the crates in handling or shipping, thus protecting greatly the fruit. The baskets when placed in the crates take the position shown in the drawings, the out ledges coming under the upper corner-pieces F, while their inner edges come under the cross-piece F, located on the under side of the top cleat at a central point. The crate is constructed of such size as to admit the baskets snugly within their keeping, thus firmly holding them between the yielding bottom and the cross-piece of the top.

The crate is provided with the retaining-wires G G, which are fastened to the end cleats at about their center, and are made to cross each other in the interior of the crate and embracing the baskets between the same. In this manner the baskets, while being held from lateral displacement to any great extent, admit a yielding of the baskets sufficient to prevent any straining to them or any injury to the fruit, due to the shocks incident to the handling of the crates in shipping.

The preferred manner in wiring in the baskets is by first running a wire around the sides of the basket over the edge of the central ring portion H and crossing them between the baskets, the ends of the wires being secured at diagonally-opposite corners; but it is obvious that the wires may be carried around the baskets differently, as when it is desired to use light boxes for holding a number of small fruit-receptacles then the wires may cross each other before inclosing the boxes and embrace them altogether without crossing between the same, as shown in dotted lines in Fig. 4. The wires G are preferably secured to the end cleats in the manner shown; but to facilitate the removal of the baskets a slot I is provided in one of the end cleates, (shown in Fig. 6), and one end of one of the retaining-wires is provided with a ring K, which serves to hold the end of the wire in the slot when said ring is turned at an angle thereto and to permit the ready unfastening to allow the removal of the baskets without impairing the wiring for further and immediate use by turning the ring so as to allow it to go through the slot. When it is desired to release the basket, the ring is pulled up and turned so as to pass through the slot, when the baskets are free to be removed.

In some instances it is necessary to have a closed top, and for this purpose I have provided the cover and locking device shown in Fig. 5, which is out of the way and efficient in its operation. The locking device consists of a bolt $a$, provided with a cross-piece $b$, the said bolt being inserted through the staple on the under side of the cleat $c$ and cover $d$. The bolt is put through the staples with the cross-piece $b$ lying in a horizontal plane, and when sufficiently far enough in the bolt is turned to bring one of the arms of the cross-piece $b$ in a vertical position, extending up between the cleat and the cover, thus locking the cover securely.

Having thus described my invention, what I claim, and desire to secure by Letters Patent, is—

1. A fruit-crate consisting of an open-sided box adapted to receive fruit-containing receptacles provided with retaining-wires fastened to the ends of said crate at substantially their corners, crossing each other one or more times in the interior of said crate, but independent of each other at such crossings, and inclosing the fruit-receptacles between the same, substantially as described, whereby a secure but yielding fastening is provided.

2. A fruit-crate consisting of an open-sided box adapted to receive fruit-containing receptacles provided with retaining-wires fastened to the end cleats of the crate at about midway of its height, running from one corner to its diagonally-opposite corner and crossing each other between the fruit-containing receptacles, substantially as described.

3. A fruit-crate adapted to receive fruit-containing receptacles provided with retaining-wires inclosing the receptacle and crossing each other within the crate, and a yielding support for the said fruit-receptacle, consisting of one or more flexible strips or slats secured within the crate at a point above the bottom, the ends of which strips are supported in the ends of the crate, substantially as described, and for the purpose set forth.

4. In a fruit-crate of the character described, the retaining-wire for holding in the fruit-receptacle and a ring provided on the end of one of the wires, in combination with a slot formed in one of the end cleats of the crate, substantially as described, whereby the end of the wire is held by said ring when inserted through the slot and turned at an angle thereto.

In testimony whereof I affix my signature in presence of two subscribing witnesses.

GEO. W. WORDEN.

Witnesses:
J. M. YZNAGA,
H. M. STERLING.